May 14, 1929.　　　G. FAST　　　1,713,175
GAS SCRUBBER
Filed May 28, 1925　　6 Sheets-Sheet 1

Inventor
Gustave Fast.
By Spear, Middleton, Donaldson & Hale
Attorney

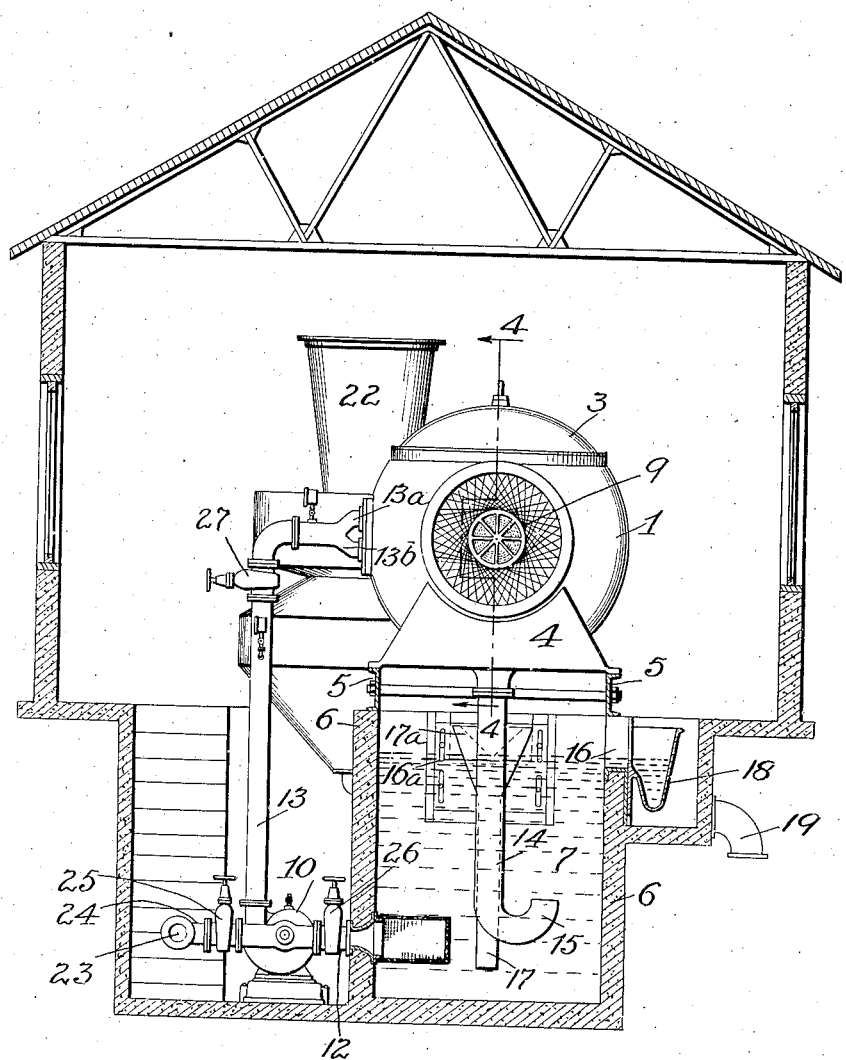

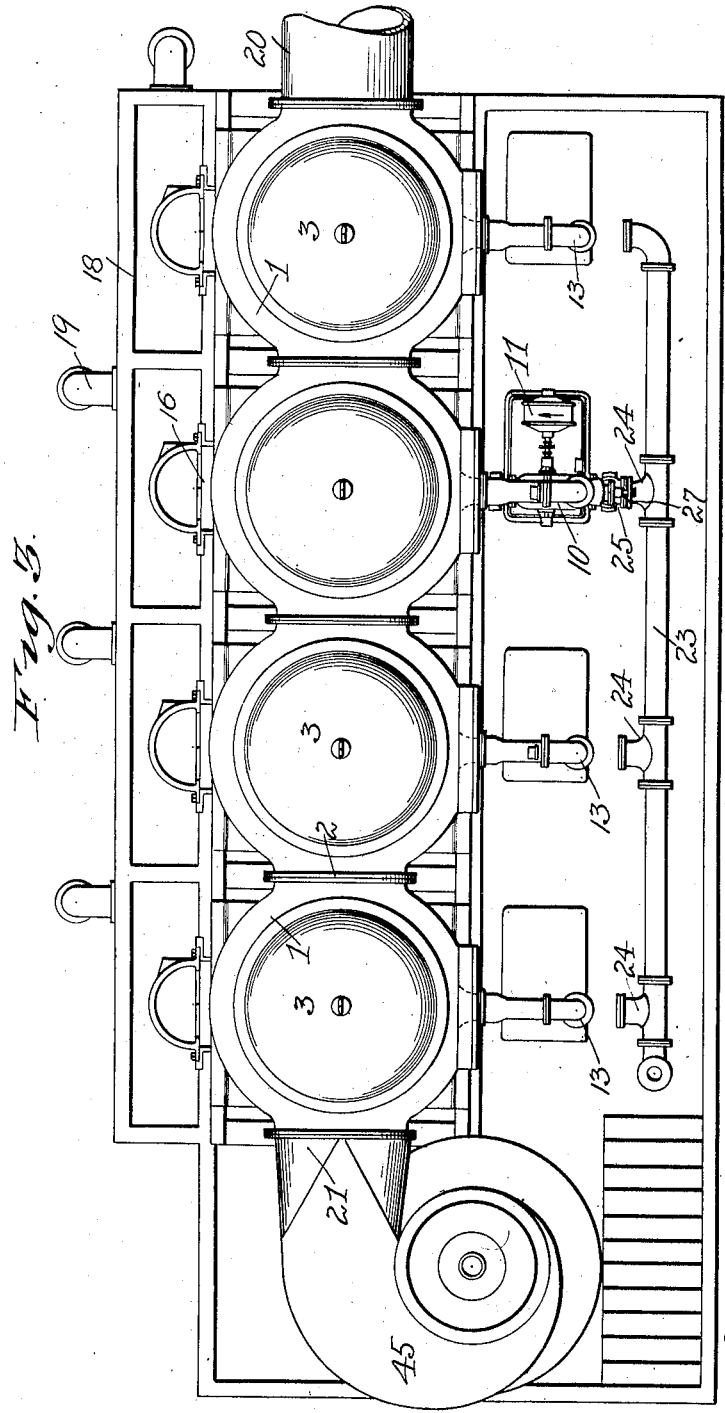

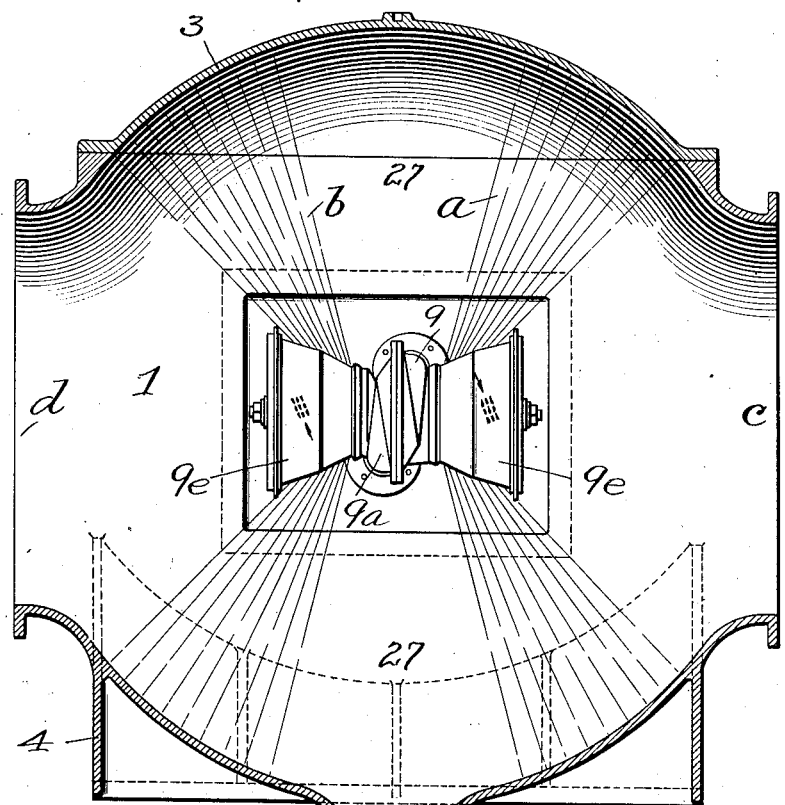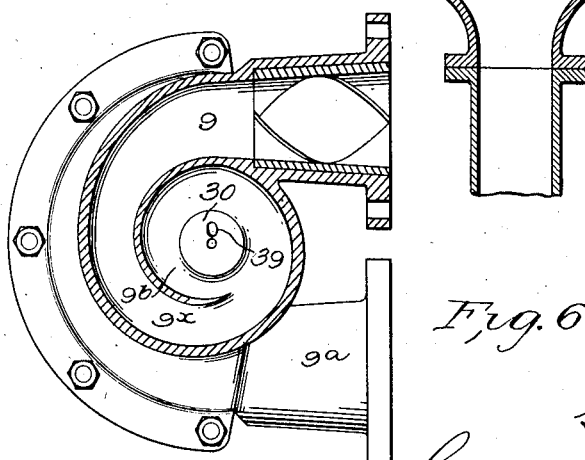

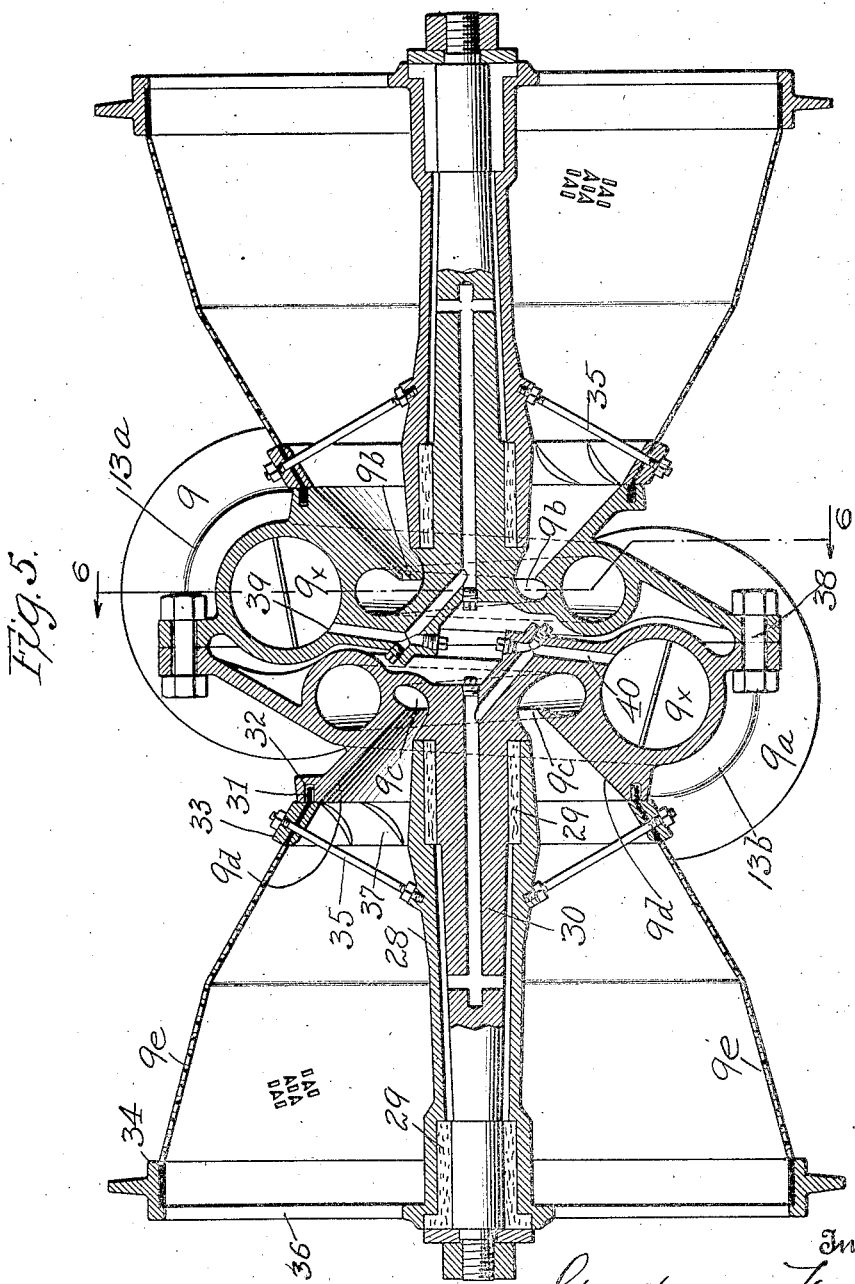

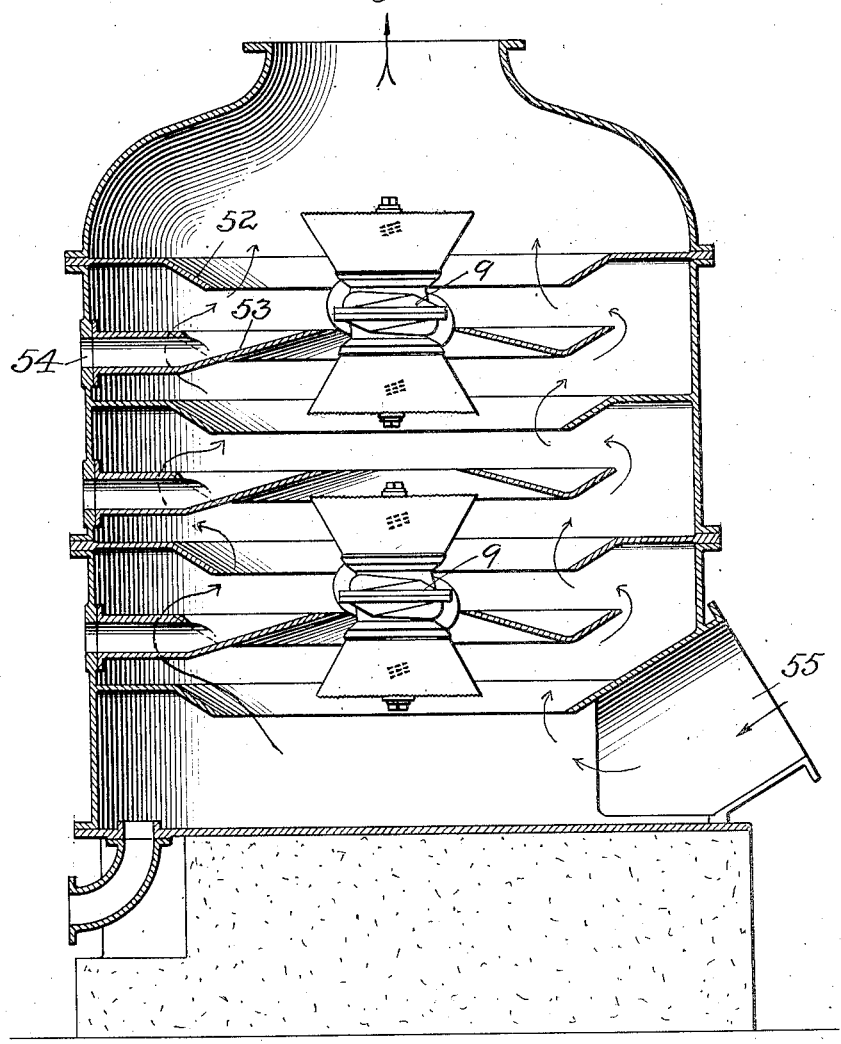

Patented May 14, 1929.

1,713,175

UNITED STATES PATENT OFFICE.

GUSTAVE FAST, OF ANNAPOLIS, MARYLAND.

GAS SCRUBBER.

Application filed May 28, 1925. Serial No. 33,428.

The invention concerns an apparatus for scrubbing gas and removing dust and recovering the valuable by-products and it consists in the features and combination and arrangement of parts hereinafter described, and particularly pointed out in the claims.

In the accompanying drawings

Fig. 2 is a transverse section substantially on line 2—2 of Fig. 1.

Fig. 3 is a plan view.

Fig. 4 is a longitudinal section substantially on line 4—4 of Fig. 2 through one of the units of the casing with the spray nozzle in place.

Fig. 5 is a longitudinal vertical section through one form of nozzle.

Fig. 6 is a transverse section of Fig. 5 through the volute on the line 6—6.

Fig. 7 is a modification of the apparatus arranged vertically instead of horizontally.

Figure 1:
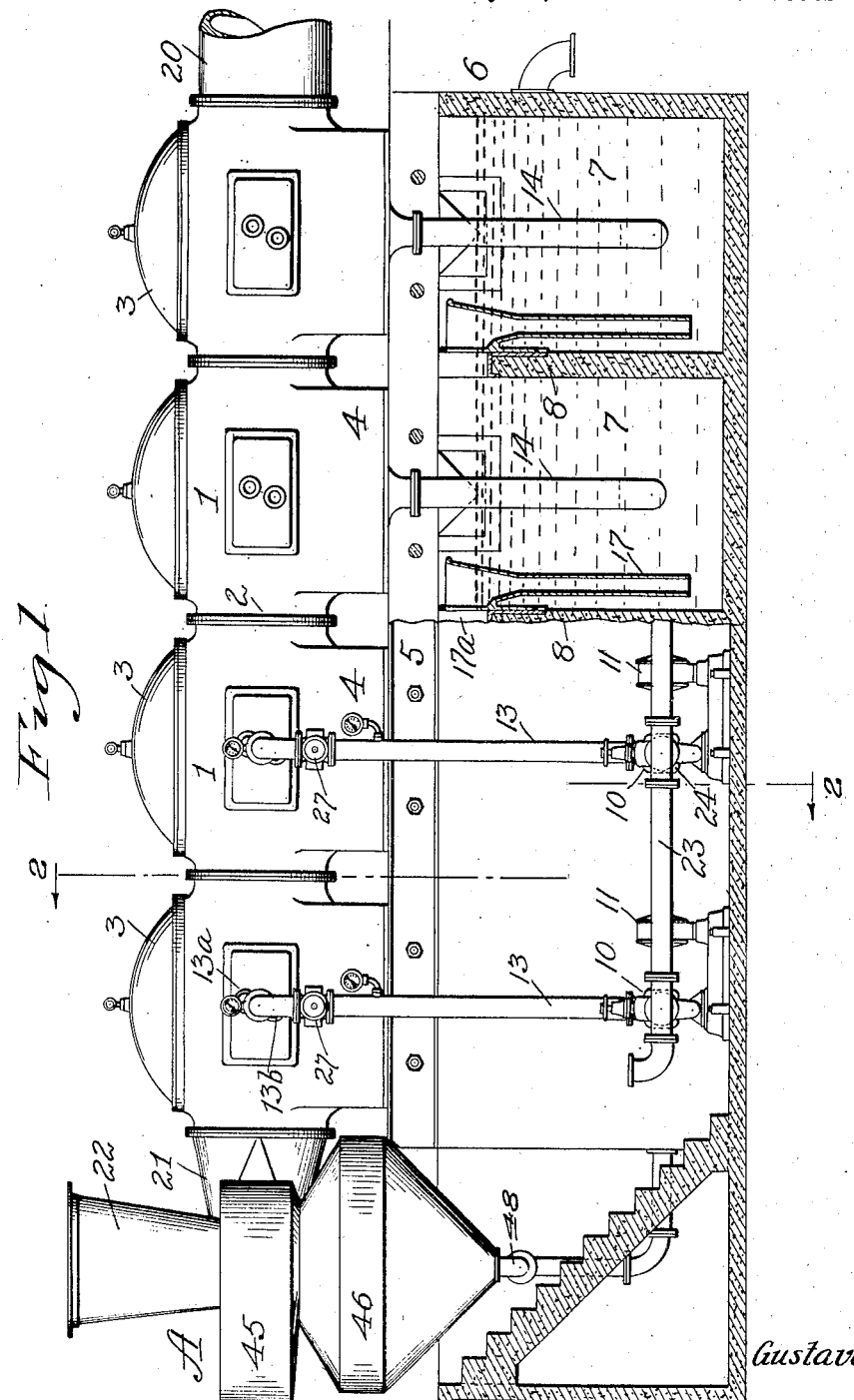
Figure 1 is a side elevation of one form of the apparatus.

The apparatus is composed of units each having its own spray device and its power plant for forcing the washing liquid through the spray device and these units may be assembled in any desired number for making the apparatus of greater or lesser extent as may be desired, and in adding or subtracting units the power plants of the other units are not altered and each is capable of adjustment to secure a greater velocity of its spray, as well as changes in the temperature of its spray independent of the other units.

The apparatus may be arranged horizontally or vertically, and in either case units may be added or taken away and the independence of the other units as to their individual operation and modification of said operation and effects will not be interfered with.

In the apparatus as embodied in horizontal form a plurality of casing or units 1 are arranged side by side and connected by their flanges 2. Each unit has a casing of general form as shown in Fig. 4, which represents a longitudinal section of the casing unit.

Each unit may have a removable top plate 3 and held to the main body by flanges screwed or bolted thereto.

Each unit has a skirt portion 4 which is flanged for attachment to suitable supporting channel beams 5 extending lengthwise of the apparatus and resting upon the walls 6 of tanks 7 which preferably are arranged below the surface of the ground. There is one of these tanks for each unit and the division walls between the tanks are indicated at 8. Each unit has a spray device therein shown generally at 9, each of which produces two annular sprays of liquid indicated at $a$, $b$, which extend transversely across the unit at points between the inlet $c$ and the outlet $d$ for the gas to and from said unit.

Each unit also has a centrifugal pump 10 which is driven by its own motor shown generally at 11 by which each pump may be driven independently of the other pumps. The pump gets part of its supply from the tank to which it belongs through an inlet pipe 12, and forces the liquid to and through the spray device by way of the pipe 13. This pipe has branches $13^a$, $13^b$ leading respectively to the two sections of the spray device 9 to produce the two sprays $a$, $b$, as will be described later.

The pump also gets what fresh cool liquid may be needed through a supply pipe 23 connected with any suitable source which has branches 24 leading to the pumps with valves 25 for regulating this supply. Other valves 26 regulate the amount of liquid to be drawn from the tank, and by means of these valves the proportion of fresh cool liquid drawn through the pipe 23 and 24 can be regulated in respect to that drawn from the tank, which owing to recirculation through the unit may be more or less heated, and thus at each unit the character of the spray liquid may be regulated to suit the requirements at that point. The volume of liquid delivered to the spray device may be regulated by the valve 27, according to requirements.

The discharge from each unit takes place through a pipe 14 which has an upwardly turned lower end 15 which directs the discharge upwardly towards the gate 16 for the overflow of liquid from the tank to a receptacle 18 one for each unit from which the liquid goes off through a pipe 19 to a suitable settling tank.

Where overflow takes place from one tank to the one next preceding it this discharge of overflow takes place through a down pipe 17 from a gate $17^a$.

The gas to be scrubbed enters the apparatus at the right of Figs. 1 and 3 through an inlet pipe 20, and then passes leftward through the units 1 and discharges through the moisture eliminator indicated generally at A which receives the gas from the left hand unit through the pipe 21 and final discharge of clean, dry gas takes place from the apparatus up through the discharge pipe 22.

The spray devices are designed to produce fine sprays of liquid projected from the center of the units transversely thereof, said sprays having a motion in a direction around the axis of the unit. In producing the spray I employ a member or members having a channel 9× of volute form and of diminishing cross sectional area from inlet to outlet. In the form shown generally at 9, 9ª there are two of these volute or spiral channels in the same organization, these being reversed in respect to each other. The orifice 9ᵇ of one of these spiral nozzles is directed towards the right and the orifice 9ᶜ of the other nozzle or volute channel is directed towards the left.

The liquid passing through these volute tapering nozzles attains high velocity and issues from the annular orifice under high centrifugal force which causes it to pass along the flaring wall 9ᵈ and the flaring screen 9ᵉ, and through the perforations in the latter and thence transversely of the space 27 between the nozzle or spray member and the opposite wall of the casing of the unit, where it is broken into a fine mist or fog, it being understood as illustrated that the axis of the spray device coincides approximately with the axis of the units.

The motion of the liquid derived from its passage through the volute channel is rotative in respect to the axis of the unit and the gas stream of course has a general direction horizontally along the units, so that the direction of the gas stream brings it into intimate contact with the spray, and as a result the direction of the gas stream in passing through the spray is changed to accord therewith and owing to the fact as above stated that the nozzle sections 9, 9ª are reversed, in respect to each other and their directions of rotative action are relatively reversed, the gas stream is subjected to change of direction on striking each of the sprays and its intimate contact therewith is enhanced. The screen member breaks up the water into a state of fine sub-division in which condition it extends across the path of the gas. The screen may be stationary or it may be mounted so as to rotate about the axis of the unit. In Fig. 5 the screen is shown as carried by a hollow shaft or sleeve 28 turnable on bearings 29, on the journals 30 forming extensions of the nozzle or volute structure. The edge 31 of the screen engages a channel 32 in the housing. The screen material is held by rings 33, 34 and tie rods 35 connect the ring 33 with the hollow shaft. The ring 34 is carried by the spider 36 which forms a support for the end of the screen. The screen member may be caused to rotate by the swirling action of the liquid thereagainst or I may provide a ring of turbine blades 37 against which the water strikes after issuing from the orifice 9ᵇ or 9ᶜ of the volute nozzle structure for thus rotating the screen and thereby accentuating the rotative action of the sheet of spray liquid about the horizontal axis of the unit, when as shown the unit is arranged with its through way or gas passage horizontal.

The spray producing organization shown in Fig. 5 is made in two sections bolted together at 38, each of these sections having one of the volute channels and the screen structure above described. For lubricating the bearings of the rotary screen members channels are provided at 39, 40 through which a portion of the water is taken from the volute channel and is directed to said bearings.

One of the volute structures receives its supply of water through the branch pipe 13ª and the other through the branch pipe 13ᵇ previously mentioned.

The openings of the screen as shown in Fig. 5 may be other than circular in order to effect the breaking up of the water and these openings may be arranged in a spiral line to accord with the spiral course of the water as it flows along and around the screen.

By my invention I remove undesirable minute particles of solids and vapors from a gas such as for instance blast furnace or producer gas by means of wet scrubbing and condensation, and recover the valuable products such as tar, ammonia, etc., from coal gas or gasoline from natural gas by means of condensation and concentration.

The apparatus will effect a complete penetration of the gas by the liquid resulting in a complete emulsifying of the solid particles and a high rate of thermal exchange between the gas and liquid and therefore rapid cooling with corresponding condensation of vapors.

The spray is distributed in a finely subdivided state uniformly over the entire cross sectional area of the gas stream in order to avoid gas channelling through portion of the liquid spray of less density should the spray lack the uniformity just mentioned.

Change in the direction of the gas stream is conducive to the separation therefrom of the dust or solid particles.

This is secured in my apparatus by the rotative sprays which in succession alternate in direction of their rotative movement.

It is also secured by the general sinuous path followed by the gas due to the shape of the casings of the units which as shown in Fig. 4 have comparatively contracted entrance and exit openings, and centrally disposed nozzles or spray devices past which the gas passes and is deflected from its straight course. Contributing to this also is the shape of the spray devices with their flaring screens.

On striking a spray the gas tends to follow the rotative direction thereof and on leaving this spray it will be subjected to eddy currents induced by the shape of the spray device or rather its conical screens, and this is a factor which accentuates the intimate contact of the gas and liquid.

If contrary to the above all the sprays had rotative movement in one direction the gas would attain a spin or rotative action always in the same direction and the same degree of intimate contact will not be attained.

Contributing also to the separating action is the changes at different points of its course of the velocity of the gas stream. This is due to the variations in the cross sectional area of the path of the gas stream at different points, as evidenced by the difference in area between the inlet or the outlet of a unit and the central part of the unit where the gas stream assumes an annular form in passing by the spray device, and also contributing to this action is the difference in diameter at the rims of the conical screens.

The first spray i. e. the one at the right of the apparatus is sensibly warm, say 150° F. due to its recirculation in contact with the hot dirty gas and on meeting this warm spray first the solid particles will emulsify to a degree that would not be accomplished if this spray were cold. Each succeeding spray is cooler than the preceding one, thus condensing more of the vapors, the amount condensed corresponding to the dew point as controlled by the temperature and pressure in the spray chamber.

The last spray i. e. that at the left of the apparatus should be only a few degrees below the temperature of the cleaned gas.

The temperature of each spray unit can be altered individually and independently of the other sprays by the adjustment of supply of cool water from pipe 23 in proportion to the supply drawn from the tank by the pump belonging to the particular unit.

Each spray chamber is sealed against the escape of gas through its tank by the outlet pipe 14 which extends into the storage tank to a considerable depth. The centrifugal pump will create a pressure at the spray nozzle of say 15 to 20 lbs. per square inch.

At the last unit nearly all the scrubbing liquid used is taken from the outside source, that is to say it is as clear and as cool as possible, and very little, if any, liquid is recirculated from the storage tank belonging to this unit. At the other units very little, if any, scrubbing fluid is added.

The overflow from the tanks through the outlets 16 goes to settling vats or thickeners for the recovery of the dust or it may go to waste.

The overflow gates from the tanks are controlled by V shaped adjustable plates 16ª. By adjusting these gates in conjunction with the control of the fresh water supply, the temperature of the liquid spray at each unit can be regulated.

At the discharge end of the apparatus a moisture entrainment eliminator A is employed as before mentioned.

This is used to remove any of the scrubbing liquid which still may be entrained as moisture in the gas after the dust has been removed, and the gas cooled to a point where most of the vapors have been condensed.

By passing the gas through the tortuous passages in the scrubbing chambers as well as the entrainment eliminator a considerable portion of the original gas pressure head is lost and in the event that the gas has to be sent some distance to its ultimate destination it is sometimes required to boost the pressure of the gas.

As generally very large quantities of gas is being handled any boosting device handling the entire quantity becomes very large, unwieldy and inefficient.

I therefore use only a small portion of the total gas for boosting purposes circulating same, from chamber 46 through supply connections 50, through a fan or blower of the closed type as shown at 49.

By increasing the pressure of this small portion of the gas through the blower and allowing it to escape through a properly shaped nozzle 51 at high velocity the pressure of the gas jet is so reduced as to form a partial vacuum at the smallest part of the discharge pipe, thus augmenting the flow of the entire gas stream. The divergent discharge pipe will convert the velocity head of the gas stream into pressure head as the velocity decreases.

As previously explained, the motive power or energy of the sprays is produced by the centrifugal pumps and no other power of any kind is supplied to the scrubber proper.

The liquid entering under a considerable pressure head derives kinetic energy through increased velocity in passing through the spirally shaped volute of constantly changing area and radius thus attaining a considerable centrifugal head.

When allowed to escape through the annular orifice or vortex $9^c$, $9^b$, it will rapidly ascend the sides of the vortex chamber $9^d$ with a high rotational velocity. The liquid then runs onto the screen, spreader or diffuser which breaks the liquid up into a fine spray or mist.

This diffuser may be either stationary or revolving.

In the stationary type the diffuser may be made of a wire screen or plate perforated with non-circular openings.

In the rotating type the diffuser is preferably made from perforated plate which makes it easier to balance.

The diffuser may be driven either by friction from the rotating spray or through a small turbine element which will utilize part of the liquid velocity for driving the diffuser.

The entire body of the liquid may be thrown against the perforated diffuser or it may be distributed evenly over the perforated diffuser by means of plate cones 9' as shown terminating at different points of the diffuser.

The inlet pipe to the volute may be provided with a twisted vane or vanes giving the liquid a rotational spin about an axis parallel to the direction of flow.

This will produce considerable eddy currents in the vortex or annular orifice which assist in breaking up of the liquid as it strikes the diffuser thus producing a finer spray.

Instead of arranging the apparatus horizontally it may, as shown in Fig. 7, be arranged vertically.

The same spray nozzles as above described may be used in this form of the apparatus and the apparatus may be composed of separable units, each of which has its own circulating system.

In this form each unit will have partitions or annular plates 52 for delivering the spray water to the pans or troughs 53 having an outlet 54 which is connected with the tank belonging to that unit. The gas enters at 55 and passes up in the circuitous path indicated by the arrows through the sprays to the upper outlet and it is subjected to the actions above described in connection with the first form, and the individual character of the units may be varied as in the form first described.

The casings of the units in which the spray nozzles are located may be of a variety of forms. These units may be of cylindrical form with partitions between them having openings in line with the axis of the cylindrical forms for the passage of the gas, and the gas in passing through the units and past the spray nozzle will assume a course in which the direction of movement will be constantly changing, and further, the velocity of the gas will be constantly changing owing to the variation in cross-sectional area of the gas path at different points along the same.

While I have described diffusers having rotary parts, I do not limit myself in this respect.

I claim:

1. A gas scrubber comprising a casing adapted for the passage of gas therethrough, a plurality of nozzles for directing rotative sprays of liquid transversely of and at all points around said casing and through which sprays the gas passes, one of said sprays rotating in the opposite direction from another of said sprays to change the direction of movement of the gas in its passage through the casing, each of said sprays being regulatable as to temperature and velocity independently of the other spray substantially as described.

2. In combination in a gas scrubber, a casing adapted for the passage of gas therethrough, a plurality of spray producing means disposed at separated points along said casing, each spray means having its own circulating system for the spray liquid, each circulating system having its own tank whereby the spray liquid of each system is kept substantially separate from the spray liquid of each other system, and means for supplying cool water to each system for independent regulation of the temperature of each spray substantially as described.

3. In combination in a gas scrubber, a casing adapted for the passage of gas therethrough, a plurality of spray producing means disposed at separated points along said casing, each spray means having its own circulating system for the spray liquid, each circulating system having its own tank whereby the spray liquid of each system is kept substantially separate from the spray liquid of each other system, means for supplying cool water to each system for independent regulation of the temperature of each spray, and an overflow connection from tank to tank, substantially as described.

In testimony whereof I affix my signature.

GUSTAVE FAST.